G. S. YINGLING.
BRAKING ATTACHMENT FOR REELS.
APPLICATION FILED OCT. 2, 1913.

1,089,616.

Patented Mar. 10, 1914.

Witnesses
Fenton S. Belt
J. H. Sherwood

Inventor
George S. Yingling
By Franklin N. Hough
Attorney

UNITED STATES PATENT OFFICE.

GEORGE S. YINGLING, OF EAU GALLIE, FLORIDA.

BRAKING ATTACHMENT FOR REELS.

1,089,616.  Specification of Letters Patent.  Patented Mar. 10, 1914.

Application filed October 2, 1913. Serial No. 793,060.

*To all whom it may concern:*

Be it known that I, GEORGE S. YINGLING, a citizen of the United States, residing at Eau Gallie, in the county of Brevard and State of Florida, have invented certain new and useful Improvements in Braking Attachments for Reels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in reels for fishing poles and the object in view is to produce a simple and efficient device of this nature comprising essentially a rotatable cylinder to be fastened to the reel and having one or more balls which are designed to be thrown out by centrifugal force as the drum rotates with the reel, the slacking of the speed of the reel causing the balls to be returned to their normal position and effecting a slight braking action.

My invention comprises various details of construction and combinations and arrangements of parts which will be hereinafter fully described, shown in the accompanying drawings and then specifically defined in the appended claims.

I illustrate my invention in the accompanying drawings, in which:—

Figure 1:
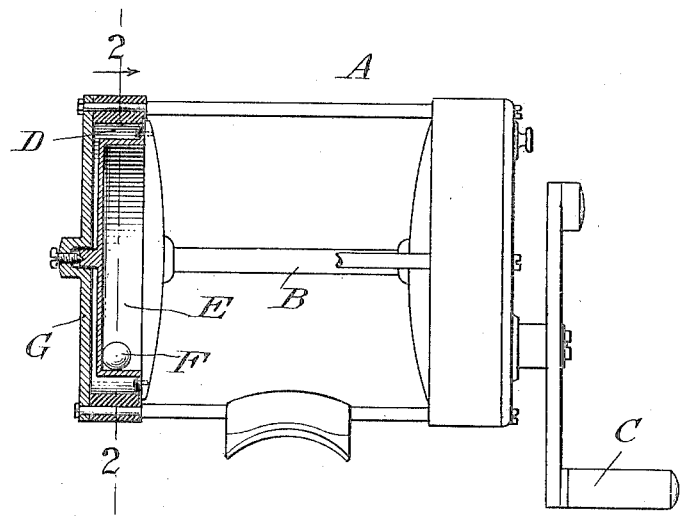
Figure 2:
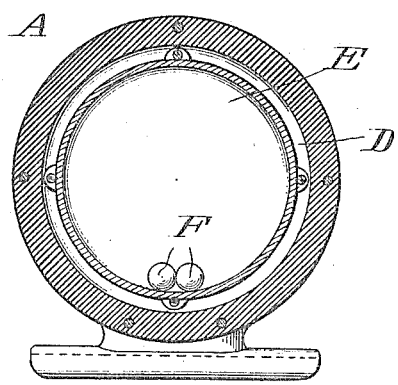

Figure 1 is a central vertical sectional view through a reel and drum attached thereto containing the centrifugally movable balls, and Fig. 2 is a sectional view on line 2—2 of Fig. 1.

Reference now being had to the details of the drawings by letter, A designates a reel of the usual construction having a shaft B operated by a handle C. The casing of the reel projects at one end beyond the end of the reel, forming a chamber D, and E is a hollow cylindrical drum which is fastened to one end of the reel and is adapted to contain one or more balls F which, as the reel is rotated with the drum, will be caused to be thrown out by centrifugal action. A cap or closure G has a flange which is secured to the projecting end of the casing, thus forming a closure to the opening containing the drum.

By the provision of an attachment to reels as shown and described, I have found that a slight resistance may be obtained proportionate to the reel spool as the reel slows down, thus preventing back lash to the line. By the provision of an attachment of this nature, the usual drag levers or springs, which are used as braking mechanism for the reel, may be dispensed with and a free run of the line will be allowed without back lash. I have found also that a line upon a reel to which my invention is applied may be cast without attention to the thumbing of the same and without tangling of the line.

What I claim to be new is:—

1. In combination with a casing of a reel and reel therein, one end of the casing projecting beyond the end of the reel, forming a chamber, a cylinder within said chamber, and centrifugally operated balls within the cylinder, as set forth.

2. In combination with a casing of a reel and reel therein, one end of the casing projecting beyond the end of the reel, forming a chamber, a cylinder within said chamber, centrifugally operated balls within the cylinder, and a closure for said chamber, as set forth.

In testimony whereof I hereunto affix my signature in presence of two witnesses.

GEORGE S. YINGLING.

Witnesses:
 LILA PERSONS,
 JNO. E. M. HODGSON.